(Model.)
J. T. SHANK.
BEE HIVE.
No. 322,982.   Patented July 28, 1885.
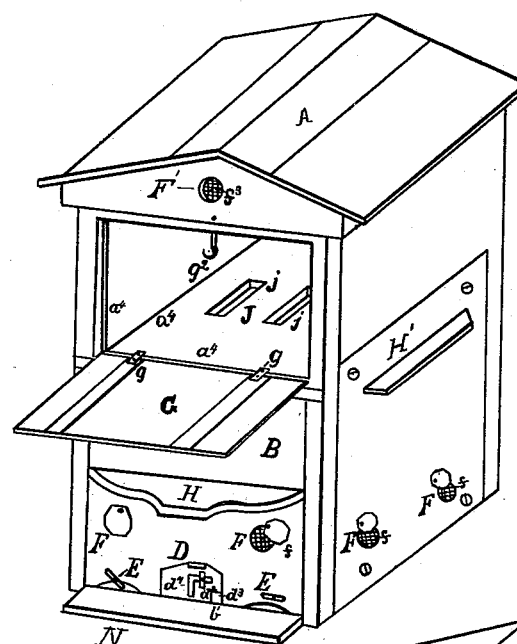
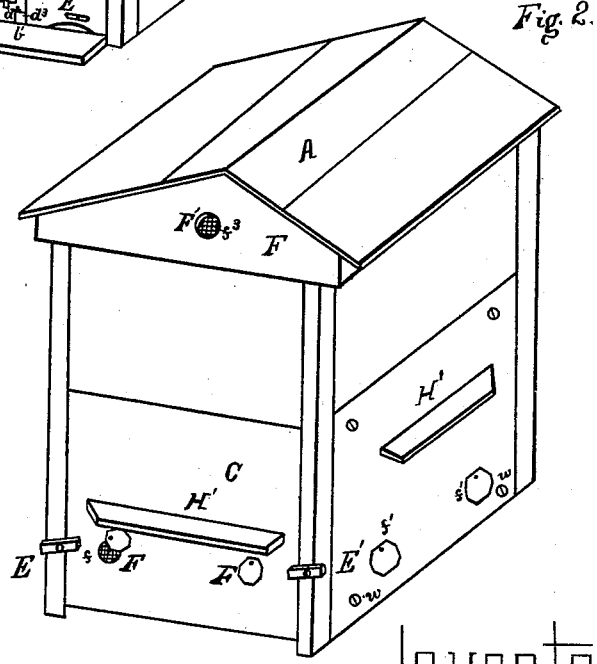
Witnesses.
C. A. Haseltine.
C. W. Thrasher
Inventor
John T. Shank
By Seward A. Haseltine.
Attorney.

(Model.)
J. T. SHANK.
BEE HIVE.
No. 322,982. Patented July 28, 1885.
2 Sheets—Sheet 2.
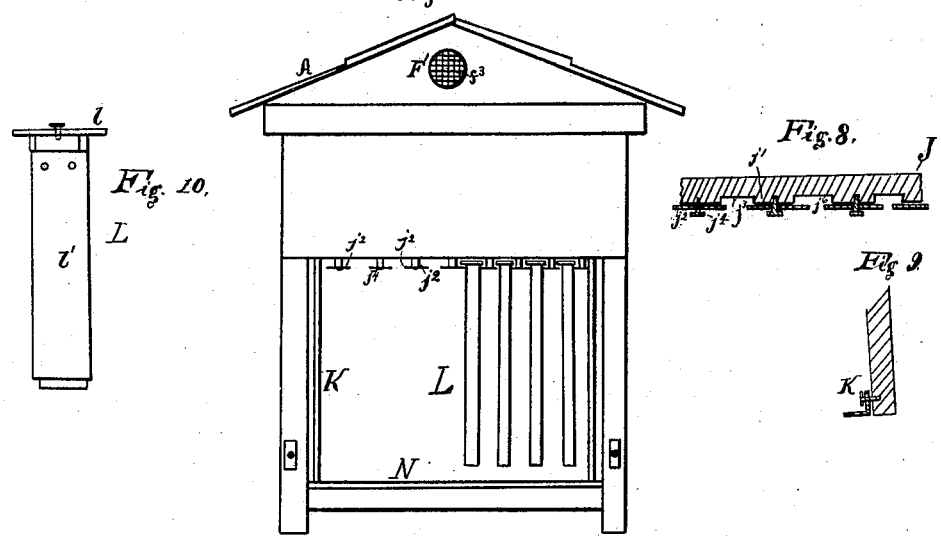
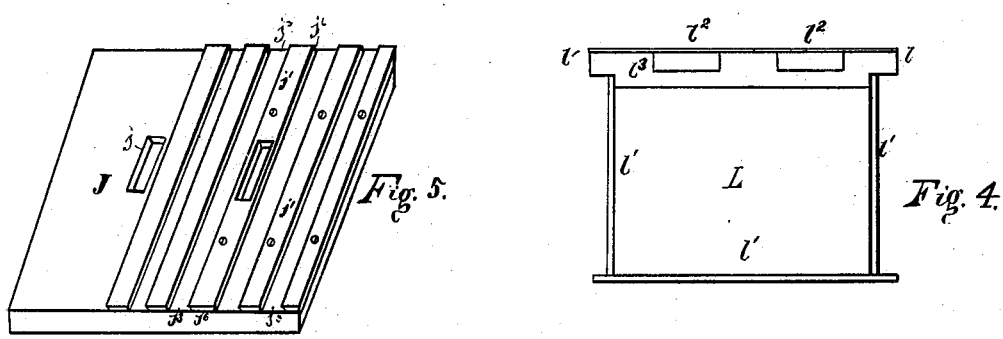
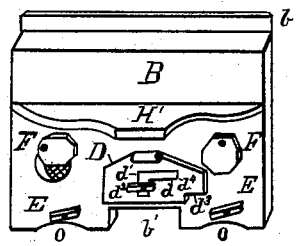
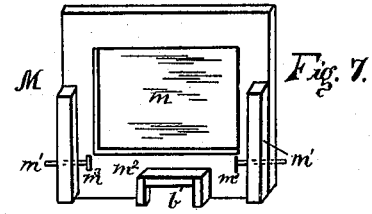
Witnesses
G. A. Haseltine.
C. W. Thrasher.
Inventor.
John T. Shank
By Seward A. Haseltine,
Attorney.

UNITED STATES PATENT OFFICE.

JOHN T. SHANK, OF SPRINGFIELD, MISSOURI, ASSIGNOR OF ONE-HALF TO ALLYN M. LAPHAM, OF SAME PLACE.

BEE-HIVE.

SPECIFICATION forming part of Letters Patent No. 322,982, dated July 28, 1885.

Application filed December 15, 1884. (Model.)

*To all whom it may concern:*

Be it known that I, JOHN T. SHANK, a citizen of the United States, residing at Springfield, in the county of Greene and State of Missouri, have invented certain new and useful Improvements in Bee-Hives; and I do hereby declare the following to be a full, clear, and exact description of the invention, such as will enable others skilled in the art to which it appertains to make and use the same.

My invention relates to improvements in bee-hives, the object of which is to provide a hive of uniform temperature by means of double walls; a device for catching moths; a means for regulating the exit of the bees; a drone-trap, and removable frames supported and arranged to prevent their being waxed or fastened in position by the bees. These objects I attain by means of the device illustrated in the accompanying drawings, forming a part of this specification, in which—

Figure 1 is a perspective view showing the front and one side of the hive. Fig. 2 is a perspective showing the back and the other side of the hive. Fig. 3 is a rear view of the hive, the two rear panels being removed in order to show the interior of the hive. Fig. 4 is a view of one of the brood-frames. Fig. 5 is a view of a modification of the part J, seen in Fig. 3, for supporting the brood-frames. Fig. 6 is a perspective view of the front outer panel of the hive detached; and Fig. 7 is a similar view of the front inner panel detached. Fig. 8 is a cross-section of honey-board J, seen in Fig. 3. Fig. 9 is a plan view showing V-shaped strip K attached to the inner side wall of the hive, and Fig. 10 is an end view of a comb-frame.

Similar letters of reference indicate corresponding parts in the several figures.

A is the removable roof of the hive, fitting over and closely thereon. The gables of said roof are provided with ventilators F', which supply air above the honey-box, and are provided with a screen, $f^3$. The honey box or boxes rest upon the removable honey-board J, which has holes or slots $j$ for permitting the bees to enter the honey box or boxes from the brood-frames. The hive is provided with double side walls to form the usual air-spaces, and the outer walls, H', are removable, and have ventilators F for admitting air to the space between the walls. These ventilators are placed at sufficient height from the bottom of the hive to prevent being filled with snow or ice, and are provided with suitable screens, $f$, to keep out mice, insects, &c., and covers $f'$ are pivoted to the walls H' for closing the ventilators, when desired. The lower portion of the front and back sides of the hive are removable.

B is a removable outside panel for the front of the hive, having a rabbet, $b$, at the upper edge, and buttons E or other suitable devices for securing the same to the base-board. Said panel is provided with a tin plate, D, which is adjustable for the purpose of regulating the size of the bee-entrance $b'$. This plate has one of its corners notched, (preferably the lower right-hand corner,) as $d^3$, leaving a space just large enough to admit but one bee at a time. It is also provided with a slot, $d^t$, made horizontal, joined by a vertical slot, $d'$, through which passes a thumb or set screw, $d^2$, entering the panel above the entrance $b'$, so that the plate may be secured thereby in any desired horizontal or vertical position, thus permitting the entrance to be entirely closed, or the plate can be raised so as to admit air into the interior of the hive without permitting the bees to escape. In the evening the plate D can be adjusted to serve as a drone-trap, by admitting the workers but shutting out the drones.

Whenever it is desired to prevent the bees from swarming, but to enable the bees to continue their work, the entrance may be entirely closed except the passage through the corner $d^3$, as shown in Fig. 1.

O O are notches in the lower edge of panel B, which serve as moth-traps, (one on each side of the entrance $b'$.) These traps are formed by making a groove scallop-shaped and opening only outward, so that millers may enter said grooves and deposit their eggs between the base-board and panel B, where they can be destroyed by removing the panel; or, if permitted to hatch, the moth can only enter the interior of the hive by means of the entrance $b'$, which the bees can guard, and thus keep them out.

M is the front inner removable panel, and is preferably provided with a pane of glass, m. This panel has cleats m' at each end on the front side, against which the outer panel B rests, so as to form a hollow wall between them. Pieces $m^2$ extend around an opening at the bottom to form an extension of the entrance b', so as to prevent the bees or insects getting between the panels. The panel M is secured in position by means of the pins $m^3$, which are passed through pieces m' and into the hive-body.

G is a door hinged to the upper part of the front of the hive, which is shown open in Fig. 1, to permit a honey-box to be placed upon the honey-board J. It has suitable hinges, g, and a catch, $g^2$, and rests, when closed, against the cleats $a^4$.

C designates a removable outer panel in the lower part of the back of the hive, and is secured by buttons or other suitable means. The inner panel of the back is also removable and of similar construction to the front inner panel, but has no bee-entrance. The walls on the sides of the hive are hollow, and the outside walls, H', are preferably secured by means of screws w, so that the space between the side walls may be filled, when desired, in cold climates with paper or other suitable material.

K are triangular upright strips of tin secured to the edges of the inner walls, which serve to prevent the bees from waxing or securing the inner front and rear removable panels to the hive.

The removable honey-board J, shown in Fig. 5, I may use, instead of that shown in Figs. 3 and 8. It is made by cutting grooves $j^3$ in its lower side, having inclined portions $j^6$, which serve to support the comb-frames L and permit of their being withdrawn endwise. The grooves may be made by attaching cleats to the board. The honey-board shown by Figs. 3 and 8 is provided with grooves similar to those marked $j^3$ in Fig. 5; but instead of the inclines $j^6$, tin strips $j^2$ are fastened to the ribs j' by screws $j^4$, and are permitted to project over the grooves $j^3$ and so serve to support the comb-frames, and permit of their being removed endwise. The comb-frames L have metal strips l attached to their upper horizontal part, which extend laterally far enough to enter grooves $j^3$ in the honey-board J and be supported therein. The upper parts of the frames may be made to enter the grooves and the tin on the frames dispensed with. The tins, however, prevent the frames from being fastened by the bees to the honey-board, and the frames are provided with one or more notches or holes, $l^2$, in the upper piece, $l^3$, for permitting the bees to pass from one side of the comb in the frame to the other to prevent the bees leaving or making holes in the comb, which weakens its fastenings. These frames may be removed from the hive when desired by drawing them from the grooves through the opening in the back of the hive.

N is the base board or floor of the hive, which is inclined forward to prevent water from standing on the same, and projects in order to form an alighting ledge.

H' are cleats secured to the outside walls to prevent them from warping, and to serve as handles and to protect the ventilators.

The honey box or boxes, which are put into the upper part of the hive, serve as an inner wall above the honey-board, as there is no inner wall to this part of the hive.

In the manner described it will be seen that I have a hive with double sides, front, and back, the space between being ventilated, and a hive which is convenient in use, which can catch moths and drones, and one in which the entrance for the bees can be adjusted.

Having thus described the construction and use of my invention, what I claim as new, and desire to secure by Letters Patent, is—

1. In a bee-hive, a honey-board, J, having the ribs j', grooves $j^3$, and metal strips $j^2$, in combination with comb-frames L, having metal strips l, as and for the purpose set forth.

2. In a bee-hive, a honey-board, J, provided with grooves capable of receiving and supporting comb-frames, in combination with comb-frames L, having an upper strip that extends laterally, and adapted to enter the said grooves and be removed endwise, as set forth.

3. In a bee-hive, a honey-board, J, having ribs j', grooves $j^3$, and the metal strips $j^2$, attached to the ribs and extending over the grooves as and for the purpose set forth.

4. In a bee-hive, a comb-frame having attached to its upper strip, $l^3$, an overhanging strip of tin, l, the strip $l^3$ being provided with the notch or notches $l^2$, as and for the purpose set forth.

5. In a bee-hive, a comb-frame having attached to its upper strip, $l^3$, an overhanging strip of metal, l, which serves as a supporting device and prevents the bees from attaching the frame to the hive or honey-board, all as shown and described.

In testimony whereof I affix my signature in presence of two witnesses.

JOHN T. SHANK.

Witnesses:
  SEWARD A. HASELTINE,
  J. T. WHITE.